(12) United States Patent
Kuiper et al.

(10) Patent No.: US 11,703,697 B2
(45) Date of Patent: Jul. 18, 2023

(54) FLUID-CONTAINING CONTACT LENS WITH SOFT POSTERIOR ELEMENT

(71) Applicant: Verily Life Sciences LLC, South San Francisco, CA (US)

(72) Inventors: Stein Kuiper, South San Francisco, CA (US); Daniel Otts, Pleasanton, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 453 days.

(21) Appl. No.: 16/721,671

(22) Filed: Dec. 19, 2019

(65) Prior Publication Data
US 2020/0201078 A1      Jun. 25, 2020

Related U.S. Application Data

(60) Provisional application No. 62/783,494, filed on Dec. 21, 2018.

(51) Int. Cl.
   G02C 7/08    (2006.01)
   G02C 7/04    (2006.01)

(52) U.S. Cl.
   CPC ............ *G02C 7/085* (2013.01); *G02C 7/049* (2013.01)

(58) Field of Classification Search
   CPC ....... G02C 7/085; G02C 7/049; G02B 26/005
   See application file for complete search history.

(56) References Cited

U.S. PATENT DOCUMENTS

| 3,488,111 A | 1/1970 | Isen |
| 3,973,837 A * | 8/1976 | Page ...................... G02C 7/041 |
| | | 351/159.33 |
| 4,166,255 A | 8/1979 | Graham |
| 5,166,710 A * | 11/1992 | Hofer ....................... G02C 7/04 |
| | | 351/159.04 |
| 6,586,548 B2 | 7/2003 | Bonafini, Jr. et al. |
| 7,018,040 B2 | 3/2006 | Blum et al. |
| 9,036,264 B2 | 5/2015 | Gupta et al. |
| 9,069,186 B2 | 6/2015 | Pugh et al. |

(Continued)

FOREIGN PATENT DOCUMENTS

| CN | 108095886 B * 10/2019 ........... A61F 9/0026 |
| EP | 0042679 A2    12/1981 |

(Continued)

OTHER PUBLICATIONS

Machine Translation of CN-108095886-B (Year: 2019).*

(Continued)

*Primary Examiner* — Darryl J Collins
*Assistant Examiner* — Matthew Y Lee
(74) *Attorney, Agent, or Firm* — Christensen O'Connor Johnson Kindness PLLC (57) ABSTRACT

A contact lens includes a posterior element, an anterior element, and a first fluid. The posterior element is adapted to conform to a surface of an eye when the contact lens is mounted on the eye. The anterior element is coupled to the posterior element to form a cavity within the contact lens. A flexibility of the posterior element is greater than a flexibility of the anterior element. The first fluid is disposed within the cavity and a distribution of the first fluid within the cavity changes in response to the posterior element conforming to the eye when the contact lens is mounted on the eye.

27 Claims, 7 Drawing Sheets

(56) References Cited

U.S. PATENT DOCUMENTS

| | | | |
|---|---|---|---|
| 2007/0153405 A1* | 7/2007 | Kuiper | G02C 7/085 |
| | | | 359/846 |
| 2010/0079724 A1 | 4/2010 | Pugh et al. | |
| 2012/0092774 A1* | 4/2012 | Pugh | G02B 3/14 |
| | | | 359/665 |
| 2013/0258277 A1 | 10/2013 | Pugh et al. | |
| 2014/0002789 A1 | 1/2014 | Pugh et al. | |
| 2015/0362754 A1* | 12/2015 | Etzkorn | G02C 7/024 |
| | | | 351/159.03 |
| 2016/0266406 A1* | 9/2016 | Meyers | G02C 7/049 |
| 2017/0307779 A1 | 10/2017 | Marullo et al. | |
| 2018/0173010 A1 | 6/2018 | Harant et al. | |
| 2018/0299701 A1 | 10/2018 | Otts | |
| 2020/0400973 A1* | 12/2020 | Larmagnac | G02C 7/049 |

FOREIGN PATENT DOCUMENTS

| | | |
|---|---|---|
| WO | 2005088388 A1 | 9/2005 |
| WO | 2007147152 A2 | 12/2007 |

OTHER PUBLICATIONS

Invitation to Pay Additional Fees & Partial Search Report, dated Apr. 20, 2020, for corresponding International Patent Application No. PCT/US2019/067851, 15 pages.

International Search Report and Written Opinion, dated Jun. 29, 2020, for corresponding International Patent Application No. PCT/US2019/067851, 19 pages.

Gas Permeable Materials, https://www.paragonvision.com/ecp/products/gp-materials, Oct. 10, 2018.

LPKF Clearweld Process, https://www.lpkfusa.com/products/laser_plastic_welding/clearweld/.

Schallhorn, "Refractive Patient Satisfaction: Expectations for Post-operative vision", EyeWorld, Sep. 2016.

Sicks, "Hybrid Lens Basics", American Optometric Association.

LPKF Clearweld Process, https://www.lpkfusa.com/products/laser_plastic_welding/clearweld/, 2016 [retrieved Oct. 25, 2018].

Sicks, "Hybrid Lens Basics", American Optometric Association, 2016.

* cited by examiner

FLUID-CONTAINING CONTACT LENS WITH SOFT POSTERIOR ELEMENT

CROSS-REFERENCE TO RELATED APPLICATIONS

This application claims the benefit of U.S. Provisional Application No. 62/783,494, filed Dec. 21, 2018, which is hereby incorporated by reference in its entirety.

TECHNICAL FIELD

This disclosure relates generally to the field of ophthalmic devices, and in particular but not exclusively, relates to electrowetting ophthalmic devices.

BACKGROUND INFORMATION

Contact lenses are worn by a large number of people throughout the world, mainly for the purpose of vision correction. Additionally, or alternatively, contact lenses may be worn for cosmetic and/or therapeutic reasons. However, as lens technology continues to progress, the functionality of contact lenses may extend beyond merely providing static vision correction to other areas. For example, eye-mountable devices (EMD), smart contact lenses, or intraocular lenses may offer unique opportunities in health monitoring, biometric sensing, dynamic vision correction, and other types of vision augmentation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of ophthalmic devices with a soft posterior element are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Ophthalmic devices, such as eye-mountable devices, contact lenses, intraocular lenses, and the like, may have various functionalities, such as, but not limited to, providing assistance in accommodation when a user's lens is no longer able to change focus as desired, as is the case for most individuals over the age of forty who are afflicted by presbyopia in varying degrees. The ophthalmic device may have a lens which provides static optical power or may have the ability to dynamically accommodate (e.g., alter the optical power of the ophthalmic device provided by the lens), so that the user may change focus similar to the natural eye.

Described herein are embodiments of an ophthalmic device (e.g., eye-mountable device, contact lens, and the like) configured or shaped to be worn or otherwise mounted to a corneal and/or scleral surface of the eye of the user. In the various embodiments described within this disclosure, the ophthalmic device may include a rigid anterior element and/or a soft posterior element, which in combination provide optical clarity and comfort to a user of the ophthalmic device. The soft posterior element is a substantially flexible structure that conforms to a surface of an eye (e.g., the corneal and/or scleral surface) when the ophthalmic device is mounted on the eye. In other words, the soft posterior element can flex, elastically deform, or otherwise adapt its shape to a mismatch (e.g., due to corneal surface irregularities, other ocular surface irregularities, design tolerances, or otherwise) between the ophthalmic device shape and the shape of the eyeball (i.e. ocular surface). Optical power provided by the ophthalmic device may be defined, at least in part, by the rigid anterior element, which remains relatively fixed in shape even when the soft posterior element deforms, and thus reduces optical aberrations that may be caused by irregular eyeball shapes and/or a mismatch in shape between the ophthalmic device and the eyeball shape. Advantageously, an ophthalmic device that leverages both a rigid anterior element and a soft posterior element may provide increased optical clarity via reduced optical aberrations and increased user comfort when worn.

In general, embodiments of the present disclosure are described in context of electrowetting contact lenses. However, it should be appreciated that the techniques and embodiments described herein are generally applicable to ophthalmic devices and should not be deemed limited to electrowetting contact lenses. For example, in some embodiments, a contact lens with a liquid-crystal accommodation element may be used in place of an electrowetting cell. Such an embodiment would advantageously still have a posterior element capable of conforming to a surface of the eye to provide optical clarity and comfort to the user.

Figure 1:
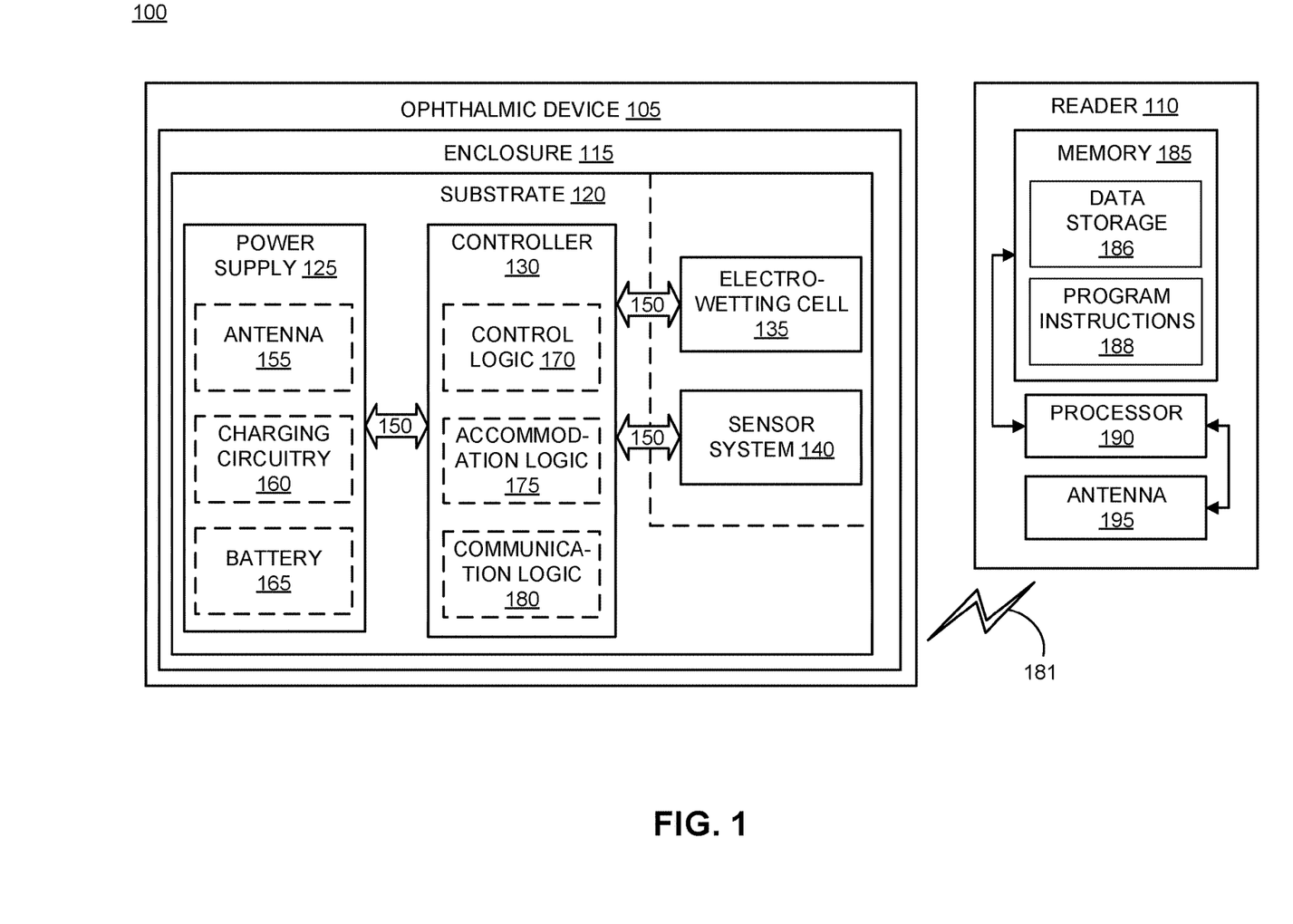
FIG. 1 illustrates a functional block diagram of an electrowetting ophthalmic device along with an external reader, in accordance with an embodiment of the disclosure.

FIG. 1 illustrates a functional block diagram 100 of an electrowetting ophthalmic device 105 along with an external reader 110, in accordance with an embodiment of the disclosure. The exposed portions of ophthalmic device 105 includes an enclosure 115 configured to be contact-mounted to a corneal surface, sclera, or other portion of an eye of a user. Substrate 120 is embedded within or surrounded by enclosure 115 and may provide a mounting surface for power supply 125, controller 130, electrowetting cell 135, sensor system 140, and various interconnects 150. Alternatively, enclosure 115 may provide a mounting surface for the various components of the ophthalmic device 105 in lieu of, or in addition to, substrate 120. The illustrated embodiment, power supply 120 includes an antenna 155, charging circuitry 160, and a battery 165. As illustrated, controller 130 includes control logic 170, accommodation logic 175, and communication logic 180. The illustrated embodiment of reader 110 includes memory 185, a processor 190, and an antenna 195. The illustrated embodiment of memory 186 includes data storage 188 and program instructions 190.

Controller 130 is coupled to receive feedback control signals from sensor system 140 and further coupled to operate electrowetting cell 135. Power supply 125 supplies operating voltages to controller 130, electrowetting cell 135, and/or sensor system 140. Antenna 155 is operated by controller 130 to communicate information to and/or from ophthalmic device 105 (e.g., transmit data, information, commands, and the like between ophthalmic device 105 and external reader 110). In the same or other embodiments, antenna 155 in conjunction with charging circuitry 160 may be operable to wirelessly charge battery 165 (e.g., via RF wireless charging, induction charging, and the like). In one embodiment, power supply 125, controller 130, electrowetting cell 135, and sensor system 140 are all situated on substrate 120. In other embodiments, electrowetting cell 135 is embedded within enclosure 115, but not disposed on substrate 120. Because ophthalmic device 105 includes electronics and is configured to be contact-mounted, it is also referred herein as an ophthalmic electronics platform, eye-mountable device, contact lens, or smart contact lens.

Enclosure 115 may include one or more biocompatible materials, such as those employed for use in contact lenses, intraocular lenses, or other ophthalmic applications. Enclosure 115 may optionally be formed in part from such biocompatible materials or may include an outer coating with such biocompatible materials. Enclosure 115 may include materials configured to moisturize the corneal surface, such as hydrogels (e.g., silicone hydrogel), and the like. In some embodiments, enclosure 115 may be composed of one or more materials such that enclosure 115, or at least portions of ophthalmic device 105 is a deformable, foldable, or otherwise "non-rigid" structure to enhance wearer comfort. In the same or other embodiments, enclosure 115 may be shaped such that ophthalmic device 105 provides a predetermined, vision-correcting (or otherwise) optical power. Enclosure 115 may be fabricated of various materials including a polymeric material, polyethylene terephthalate ("PET"), polyhydroxyethylmethacrylate ("polyHEMA"), a hydrogel, silicone, silicone based polymers, AcrySof® proprietary co-polymers, other co-polymers, parylene, combinations of these, or otherwise.

Substrate 120 includes one or more surfaces suitable for mounting power supply 125, controller 130, electrowetting cell 135, and sensor system 140. Substrate 120 may be employed both as a mounting platform for chip-based circuitry (e.g., by flip-chip mounting) and/or as a platform for patterning conductive materials (e.g., gold, platinum, palladium, titanium, copper, aluminum, silver, nanowires, valve metals, other metals, other conductive materials, combinations of these, etc.) to create electrodes, interconnects, antenna(s), etc. In some embodiments, substantially transparent conductive materials (e.g., indium tin oxide, metal nanowire mesh, and the like) may be patterned on substrate 120 or otherwise disposed within enclosure 115 for circuitry, electrodes, etc. In the same or other embodiments, conductive materials may comprise a valve metal (e.g., aluminum, hafnium, niobium, tantalum, titanium, tungsten, vanadium, zirconium, bismuth) as part of a self-healing electrowetting system. In one embodiment, antenna 155 may be formed by depositing a pattern of gold or another conductive material on substrate 120. Similarly, interconnects 150 may be formed by depositing suitable patterns of conductive materials on the substrate 120, or otherwise within enclosure 115. A combination of resists, masks, and deposition techniques may be employed to pattern materials on substrate 120. Substrate 120 may be a relatively rigid material, such as polymethyl methacrylate ("PMMA"), polyethylene terephthalate ("PET"), Parylene C, Parylene HT, polyimide, crosslinked silicones, fluorosilicone acrylates, acrylates, other materials, or a combination of materials sufficient to structurally support the circuitry and/or electronics within enclosure 115. In other embodiments, ophthalmic device 105 may alternatively be arranged with a group of physically distinct substrates rather than a single substrate. In one embodiment, controller 130, battery 165, and electrowetting cell 135 may be mounted to one substrate, while antenna 155 and sensor system 140 are mounted to another substrate and the two substrates may be electrically connected or otherwise coupled via interconnects 150.

In some embodiments, power supply 125, controller 130, and sensing system 140 may be positioned away from the center (e.g., within a peripheral region) of ophthalmic device 105 and thereby avoid interference with light transmission to the eye through the center of ophthalmic device 105. In contrast, electrowetting cell 135 may be centrally positioned to provide accommodation for the wearer of ophthalmic device 105 by correcting the light (e.g., applying or adjusting optical power applied) transmitted to the eye through the center of ophthalmic device 105. In some embodiments, sensor system 140 includes a sensor trace electrically coupled to one or more discrete photodetectors (e.g., photodiodes), capacitors, electrochemical sensors, electrodes/traces, and the like, that are distributed, for example, to sense a physiological response of the eye that is indicative of an accommodative effort. The physiological response may correspond to eyelid overlap, gaze direction, ocular muscle (e.g., ciliary or iris muscle) constriction or relaxation, and the like. The sensor system may generate an accommodation signal (e.g., a feedback signal) that is representative of the measured or otherwise determined physiological response. In some embodiments, sensor system 140 and/or substrate 120 are substantially transparent to incoming visible light to mitigate interference with light transmission to the eye.

In the illustrated embodiment, power supply 125 includes a battery 165 to power the various embedded electronics, including controller 130, electrowetting cell 135, and sensor system 140. Battery 165 may be inductively charged by charging circuitry 160 and antenna 155 acting as an energy harvesting antenna. In some embodiments, battery 165 may be a capacitor. In the illustrated embodiment, antenna 155 is time-shared for inductive charging and wireless communications with reader 110. In other embodiments, separate antennas may be utilized to individually and simultaneously provide the respective functions of inductive charging and wireless communication.

Charging circuitry 160 may include a rectifier/regulator to condition the captured energy for charging battery 165 or directly powering controller 130 without battery 165. Charging circuitry 160 may also include one or more energy storage devices to mitigate high frequency variations that may be present when antenna 155 is used for inductive or RF wireless charging. In one embodiment, charging circuitry 160 includes one or more energy storage devices (e.g., a capacitor, an inductor, etc.) coupled to function as a low-pass filter.

Controller 130 contains logic to choreograph the operation of the other embedded components of ophthalmic device 105. Control logic 170 controls the general operation of ophthalmic device 105, including providing a logical user interface, power control functionality, accommodation adjustment, etc. Accommodation logic 175 includes logic for monitoring feedback signals from sensor system 140 (e.g., the accommodation signal), determining whether the feedback signal is indicative of an accommodative effort (e.g., ciliary muscle constriction, change in gaze direction, focal distance of the user, and the like), and manipulating electrowetting cell 135 in response to the feedback signal to provide the appropriate level of accommodation (e.g., amount of optical power) to the user. In some embodiments, auto-accommodation may be implemented in real-time based upon monitoring the feedback signal (e.g., via sensor system 140), or permit the user control to select specific accommodation regimes (e.g., near-field accommodation for reading, far-field accommodation for regular activities, and the like). Communication logic 180 provides communication protocols for wireless communication with reader 110 via antenna 155. In one embodiment, communication logic 180 provides backscatter communication via antenna 155 when in the presence of an electromagnetic radiation 181 output from reader 110. In one embodiment, communication logic 180 operates as a smart wireless radio-frequency identification ("RFID") tag that modulates the impedance of antenna 155 for backscatter wireless communications. The various logic modules of controller 130 may be implemented in software/firmware (e.g., controller 130 may include a processor coupled to memory storing instructions), in hardware logic (e.g., application specific integrated circuits, field-programmable gate arrays, and so on), or a combination thereof that when executed causes ophthalmic device 105 to perform operations (e.g., adjusting a shape of a lens included in electrowetting cell 135 to provide auto-accommodation based on feedback signals from sensor system 140).

It is noted that the functional block diagram 100 shown in FIG. 1 is described in connection with functional modules for convenience in description, but does not necessarily connote physical organization. Rather, embodiments of ophthalmic device 105 may be arranged with one or more functional modules ("sub-systems") implemented in a single chip, multiple chips, in one or more integrated circuits, or otherwise.

Furthermore, it is appreciated that components of ophthalmic device 105 may correspond to one or more elements of functional block diagram 100 and/or conversely that one or more elements of functional block diagram 100 may correspond to an individual component of ophthalmic device 105. In one embodiment, electrowetting cell 125 may include a rigid anterior element and a soft posterior element to form a cavity of the ophthalmic device 105 for electrowetting purposes. The rigid anterior element may also functionally serve as substrate 120 for mounting the various component of ophthalmic device 105. In the same or other embodiments, the soft posterior element and rigid anterior element may collectively correspond to enclosure 115. In one embodiment, enclosure 115 may correspond to multiple components of ophthalmic device 105 (e.g., any one of, or a combination of, an anterior element, a posterior element, an encasement, or an overmold).

External reader 110 includes an antenna 195 (or group of more than one antennas) to send and receive wireless signals 181 (e.g., electromagnetic radiation) to and from ophthalmic device 105. External reader 110 also includes a computing system with a processor 190 in communication with memory 186. Memory 186 is a non-transitory computer-readable medium that may include, without limitation, magnetic disks, optical disks, organic memory, and/or any other volatile (e.g., RAM) or non-volatile (e.g., ROM) storage system readable by processor 190. Memory 185 may include data storage 186 to store indications of data, such as data logs and program settings (e.g., to adjust behavior of ophthalmic device 105 and/or external reader 110), etc. Memory 185 may also include program instructions 188 for execution by processor 190 to cause external reader 110 to perform processes specified by the program instructions 188. In some embodiments, external reader 110 may be a smart phone or other portable computing device capable of wirelessly communicating with ophthalmic device 105.

Figure 2A:
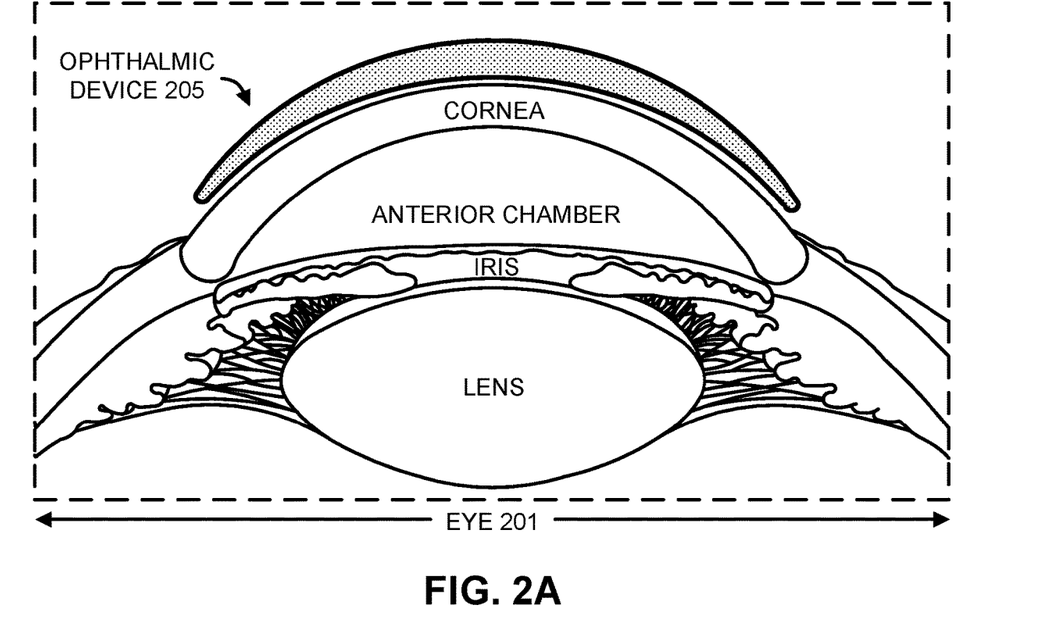
FIG. 2A illustrates a side view of an ophthalmic device mounted on an eye, in accordance with an embodiment of the disclosure.
Figure 2B:
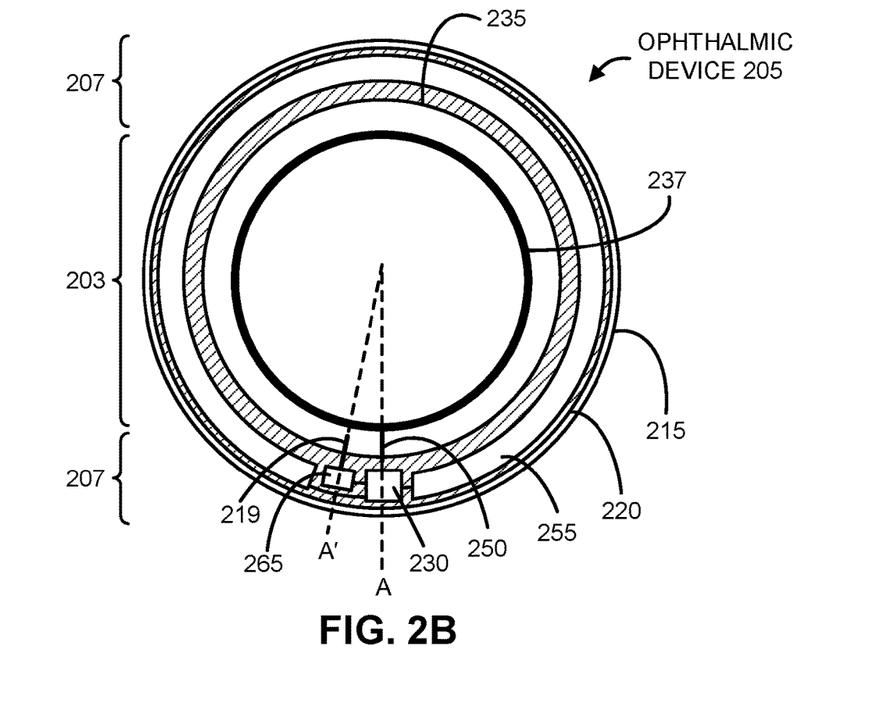
FIG. 2B illustrates a top view of an ophthalmic device, in accordance with an embodiment of the disclosure.
Figure 2C:
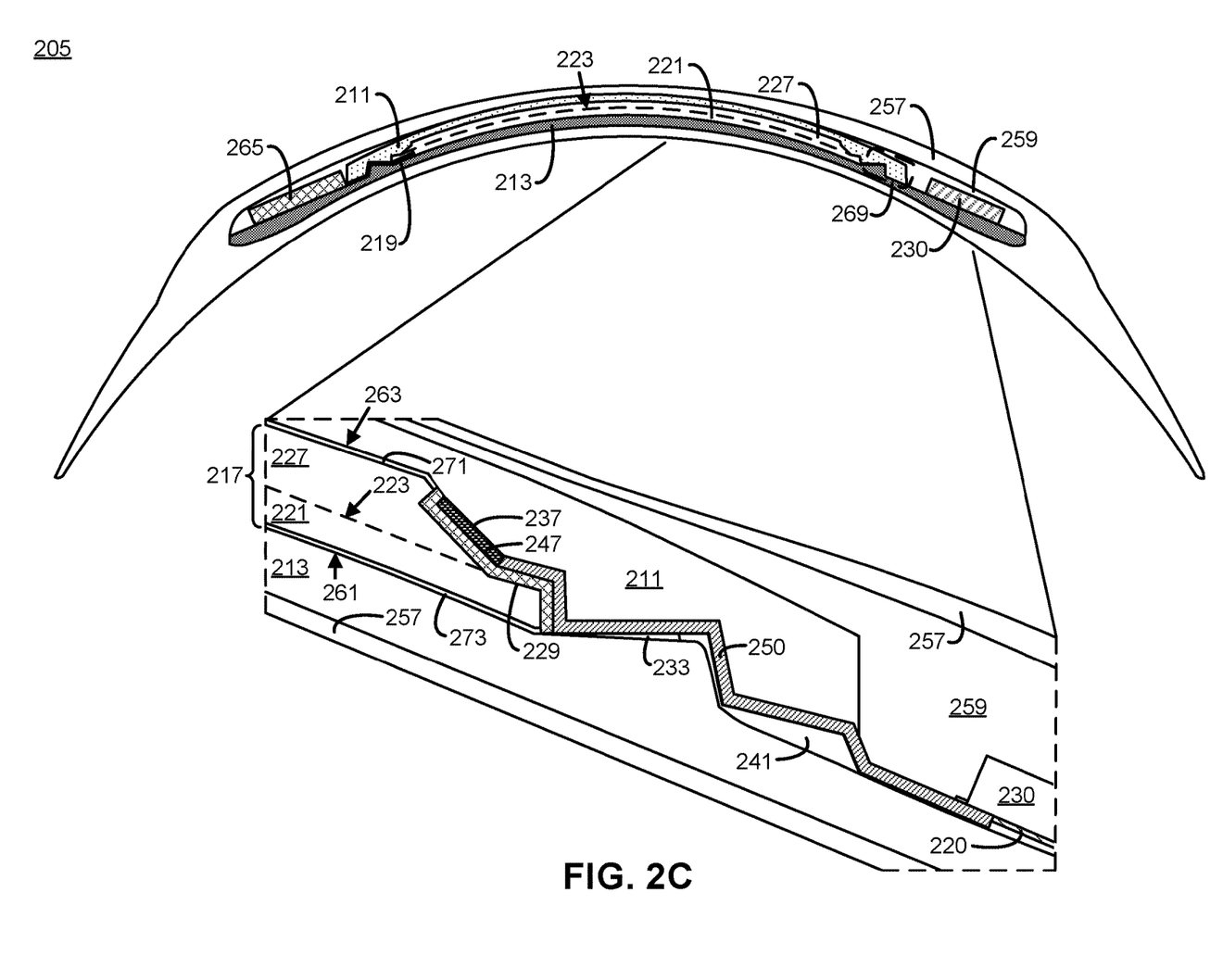
FIG. 2C illustrates a cross-sectional view of an ophthalmic device, in accordance with an embodiment of the disclosure.

FIGS. 2A-2C respectively illustrate a side view, a top view, and a cross-sectional view of ophthalmic device 205, in accordance with an embodiment of the disclosure. FIG. 2A is a side view of ophthalmic device 205 contact mounted with a surface of eye 401 (e.g., a corneal and/or scleral surface), while FIG. 2B is a top view of ophthalmic device 205. Ophthalmic device 205 includes enclosure 215, substrate 220, controller 230, electrowetting cell 235, electrode 237, interconnect 250, antenna 255, and battery 265, which may be analogous to their identically named components included in ophthalmic device 105 of FIG. 1. In other words, ophthalmic device 205 is one possible implementation of ophthalmic device 105 illustrated in FIG. 1, and may include the same or similar features, structures, characteristics, or combination thereof in accordance with embodiments of the disclosure.

As illustrated in FIG. 2A, ophthalmic device 205 is an eye-mountable device (e.g., contact lens) configured, or otherwise shaped, to be mounted on eye 201. More specifically, the illustrated embodiment shows ophthalmic device 205 having a concave surface configured to adhere ("mount") to a moistened corneal surface (e.g., by capillary forces with a tear film coating the corneal surface). Additionally or alternatively, ophthalmic device 205 may be adhered by a vacuum force between the corneal surface and the concave surface of ophthalmic device 205.

In the illustrated embodiment, ophthalmic device 205 includes substrate 220, controller 230, electrowetting cell 235, electrode 237, interconnect 250, antenna 255, and battery 265 disposed within enclosure 210. Electrowetting cell 235 is centrally located within enclosure 215 and is coupled to controller 230 via interconnect 250 to provide accommodation to the user. More specifically, electrowetting cell 235 provides an optical power that is adjustable based, at least in part, on an applied bias (e.g., voltage) between electrode 237 and a second electrode (e.g., electrode 219). In some embodiments, ophthalmic device 205 may include a sensor system (e.g., sensor system 140 illustrated in FIG. 1) to provide an accommodation signal representative of a physiological response of the eye that is indicative of an accommodative effort. It is appreciated that the arrangement of individual components of ophthalmic device 205 are merely demonstrative and that placement of individual components should not be deemed limited to the exact illustrated embodiment. In some embodiments, battery 265 may be placed at an opposite side of the ophthalmic device 205 with respect to controller 230 (e.g., line A-A' would be a straight line).

As illustrated in FIG. 2B, electrode 237 is a conical electrode that extends around electrowetting cell 235. In other words, the term "conical" indicates that electrode 237 may form a loop, circle, oval, or otherwise define a boundary within electrowetting cell 235. The specific shape of electrode 237 may be used to define a general shape of the lens formed by electrowetting cell 235. In one embodiment, electrode 237 has a circular shape such that the meniscus of two immiscible fluids within electrowetting cell 235 forms a spherical lens. The inner region formed by electrode 237 (e.g., the area encircled or enclosed by electrode 237) may correspond to a central region 203 of ophthalmic device 205, while the outer region (e.g., the area outside of the central region) may correspond to a peripheral region 207 of ophthalmic device 205. In some embodiments, ophthalmic device 205 is configured (e.g., shaped) such that the lens formed by electrowetting cell 235 within central region 203 is aligned with the eye (e.g., pupil) to provide accommodation for the eye (e.g., the lens is aligned within the optical path of light entering the eye), while the peripheral region 207 is positioned outside of the optical path (e.g., iris, sclera, or otherwise) such that components of ophthalmic device 205 that are not substantially optically transparent do not interfere with the vision of the user.

In the illustrated embodiment, substrate 220 may be a support structure for mounting the various components of ophthalmic device 205, such as controller 230, electrowetting cell 235, interconnect 250, antenna 255, and battery 265 within enclosure 215. In some embodiments, substrate 220 is an optically transparent (e.g., substantially transparent or otherwise transmissive to light within the visible spectrum of electromagnetic radiation) substrate formed from transparent polymers such as cross-linked siloxanes (e.g., polydimethylsiloxanes), transparent polyetherimide resins such as ULTEM™ manufactured by SABIC, PET, methylmethacrylates, and the like. In one embodiment, substrate 220 is an annular substrate coupled to (e.g., via interconnect 250) electrowetting cell 235. Electrowetting cell 235 may include a rigid anterior element separate from substrate 220 to provide support and/or rigidity to electrowetting cell 235 and consequently ophthalmic device 205.

FIG. 2C illustrates a cross-sectional view of ophthalmic device 205 with posterior element 213, in accordance with an embodiment of the disclosure. More specifically, FIG. 2C illustrates a cross-sectional view of ophthalmic device 205 along line A-A' illustrated in FIG. 2B. Referring back to FIG. 2C, ophthalmic device 205 includes anterior element 211, posterior element 213, first fluid 221, second fluid 227, interface 223, cavity 217, substrate 220, dielectric 229, reference electrode 219, conical electrode 237, barrier layer 247, interconnect 250, controller 230, battery 265, first sealant 233, second sealant 241, encasement 259, overmold 257, reciprocal alignment features 269, first repelling layer 271, and second repelling layer 273. In some embodiments of the disclosure, anterior element 211, posterior element 213, cavity 217, first fluid 221, second fluid 227, interface 223, dielectric 229, barrier layer 247, conical electrode 237, and reference electrode 218 may be collectively referred to as an electrowetting cell (e.g., electrowetting cell 135 of FIG. 1 and/or electrowetting cell 235 of FIG. 2B). In the same or other embodiments of the disclosure, any one of, or a combination of, anterior element 211, posterior element 213, encasement 259, and/or overmold 257 may be referred to as an enclosure (e.g., enclosure 115 of FIG. 1 and/or enclosure 215 of FIG. 2B).

As illustrated in FIG. 2C, posterior element 213 and anterior element 211 are coupled together (e.g., via first sealant 233, second sealant 241, and reciprocal alignment features 269) to form cavity 217 within ophthalmic device 205. More specifically a concave surface of anterior element 211 (e.g., the inner surface 263 of anterior element 211) is disposed between a convex surface of the posterior element 213 (e.g., the inner surface 261 of posterior element 213) and a convex surface of anterior element 211 (e.g., the outer surface of anterior element 211 proximate to overmold 257) such that the concave surface of anterior element 211 and the convex surface of the posterior element 213 define a boundary of cavity 217. In the illustrated embodiment, anterior element 211 and posterior element 213 are optically transparent windows formed from one or more optically transparent materials that in conjunction with one or more sealants (e.g., first sealant 233 and second sealant 241) form cavity 217 that encloses, seals, or otherwise encapsulates first fluid 221 and second fluid 227. In some embodiments, first fluid 221 and second fluid 227 are density matched (e.g., have a density difference within a pre-determined threshold range) to negate the effect of gravity on the optical interface (e.g., interface 223) formed by the fluids (e.g., when captive or otherwise contained within a cavity). In one embodiment, the optical window defined by cavity 217 has a diameter of approximately 6 mm, while a central thickness of ophthalmic device 205 is approximately 0.485 mm. In some embodiments, anterior element 213, posterior element 211, first sealant 233, second sealant 241, and/or a combination thereof corresponds to an enclosure (e.g., enclosure 115 of FIG. 1 and/or enclosure 215 of FIG. 2B) configured to mount on an eye (e.g., a contact lens). In one embodiment, first sealant 233 is a pressure sensitive adhesive (e.g., silicone pressure sensitive adhesive) and second sealant 241 is a glue (e.g., curable silicones such as two-part Pt cure silicones, RTV moisture cure-silicones, UV-curable silicones, and the like). In the same or other embodiments, first sealant 233 and/or second sealant 241 corresponds to the resultant interface formed by laser beam welding posterior element 211 to anterior element 213. In another embodiment, first sealant 233 and/or second sealant 241 is a laser absorbing material or additive (e.g., Clearweld® produced by LPKF Laser & Electronics AG) that is utilized to seal posterior element 211 to anterior element 213 via laser welding.

Disposed within cavity 217 are two immiscible fluids (e.g., first fluid 221 and second fluid 227), which form an interface 223 (e.g., a meniscus) due to the immiscibility between first fluid 221 and second fluid 227. Interface 223 represents a boundary between two materials (e.g., first fluid 221 and second fluid 227) having different refractive indexes, which form a lens within cavity 217 to provide adjustable optical power to ophthalmic device 205 that is dependent on a shape of interface 223. The shape of interface 223 is based, at least in part, on a bias (or lack thereof) applied between reference electrode 219 and conical electrode 237 (e.g., via controller 230 coupled to battery 265). Light propagating through ophthalmic device 205 (e.g., central region 203 illustrated in FIG. 2B) may be adjusted (e.g., caused to converge and/or diverge in varying degrees) based on the optical power of ophthalmic device 205.

In one embodiment, first fluid 221 includes a polar liquid (e.g., water, glycol, liquid crystal, etc.), while second fluid 227 includes a substantially non-polar liquid (e.g., oil, such as silicone oil or alkanes). In the same or other embodiments, first fluid 221 may be an electrolyte solution that is electrically conductive. For example, first fluid 221 may include a solvent (e.g., water, glycol, or acetic acid) in which an electrolyte (e.g., saline, citric acid, etc.) is dissolved. The electrolyte may be a chemical compound, such as a salt, an acid, or a base that dissociates into ions when dissolved in the solvent, making first fluid 221 an ionic electrical conductor. In one embodiment, first fluid is a 0.01 M aqueous solution of citric acid. In another embodiment, first fluid 221 is 0.01 M ammonium citrate tribasic solution.

Anterior element 211 and posterior element 213 are designed to provide optical clarity to ophthalmic device 205 while maintaining user comfort when ophthalmic device 205 is worn. In some embodiments, anterior element 211 is a rigid (i.e., hard), gas permeable material (e.g., with respect to oxygen) that provides a well-defined lens shape for enhanced optical clarity, while posterior element 213 is a soft material that conforms to a shape of the eye of the user when ophthalmic device 205 is worn for increased comfort. In embodiments of the disclosure, conform indicates that a shape of the posterior element 213 changes (e.g., flexes, elastically deforms, or the like) to provide a better fit (i.e., shape match) of ophthalmic device 205 to a surface of the eye compared to if the shape of the posterior element 213 did not change. Conforming does not necessarily indicate that that the shape of the posterior element 213 will perfectly match the surface of the eye when ophthalmic device 205 is mounted on the eye, in accordance with embodiments of the disclosure. In some embodiments, posterior element 213 will partially conform, while a tear fluid or film or the eye may fill up any remaining mismatch. For example, the tear fluid of the eye may fill any microgrooves that may be present on a surface of the posterior element 213 and/or overmold 257. In some embodiments, the composition of anterior element 211 and posterior element 213 may be substantially identical, however due to geometric design, the posterior element may elastically deform, for example, where thin regions of posterior element 213 are present.

Concisely, posterior element 213 has flexibility greater than the flexibility of anterior element 211. Flexibility is inversely related to stiffness which depends on both intrinsic (e.g., elastic modulus) and extrinsic (e.g., shape, curvature, thickness) material properties. In one embodiment, the flexibility of posterior element 213 is greater than that of anterior element 211 due to any one of, or a combination of, the intrinsic and extrinsic material properties.

In one embodiment, posterior element 213 and anterior element 211 have substantially the same material composition and the difference in flexibility is due to extrinsic material properties (e.g., geometric structure differences such as shape, structure, and/or thickness differences). For example, posterior element 213 may have a greater curvature and/or thinner cross-sectional area relative to anterior element 211 such that posterior element 213 is more flexible than anterior element 211.

In the same or other embodiments, anterior element 211 has an elastic modulus greater than posterior element 213 to provide greater rigidity to ophthalmic device 205 relative to posterior element 213. In some embodiments, anterior element 211 may have an elastic modulus greater than 10 MPa, greater than 100 MPa, or greater than 1000 MPa, while posterior element 213 may have an elastic modulus less than 10 MPa, less than 5 MPa, or less than 1 MPa. In some embodiments, the elastic modulus of anterior element 211 is 1.5 times, 2 times, 5 times, 10 times, 100 times, 1000 times, or more than the elastic modulus of posterior element 213. In one embodiment, posterior element 213 has an elastic modulus of approximately 2 MPa while anterior element 211 has an elastic modulus of approximately 3000 MPa. Additionally, anterior element 211 and posterior element 213 may have oxygen permeability sufficient to supply oxygen to the eye (e.g., to prevent hypoxia) when ophthalmic device 205 is worn. In some embodiments, anterior element 211 and/or posterior element 213 has an oxygen gas permeability value greater than 10 Barrer, greater than 30 Barrer, greater than 60 Barrer, or greater than 100 Barrer. In some embodiments, posterior element 213 is a soft material having a material composition including at least one of a silicone, a hydrogel, or a silicone hydrogel. In the same or other embodiments, anterior element 211 is a rigid gas permeable material having a material composition including at least one of poly(methyl methacrylate), a cross-linked silicone, or a fluoro-silicone acrylate. In one embodiment, ophthalmic device 205 is collectively oxygen permeable with an overall gas permeability to oxygen greater than at least one of 10, 50, or 100 Barrer. In the same or other embodiments, individual component (e.g., anterior element 211, posterior element 213, first repelling layer 271, second repelling layer 273, overmold 257, and/or other components) each have a gas permeability to oxygen greater than at least one of 10 Barrer, 30 Barrer, or more.

Advantageously, a rigid anterior element 213 and a soft posterior element 211 may provide optically clear vision correction while maintaining user comfort when ophthalmic device 205 is worn. Vision correction or accommodation is provided, at least in part, by the adjustable optical power of ophthalmic device 205 that is based, at least in part, on anterior element 211. In one embodiment, an outer surface of anterior element 211 (e.g., the surface of anterior element 211 proximate to overmold 257) has a fixed shaped to provide, at least in part, a base optical power to ophthalmic device 205. Interface 223 is also defined, at least in part, by anterior element 213 and has a controllable shape to provide adjustable optical power (e.g., positive or negative optical power) that may be added to the base optical power. Therefore, optical power and optical clarity of ophthalmic device 205 are based, at least in part, on anterior element 211. In some embodiments, anterior element 211 maintains a relatively constant shape even when external forces (e.g., due to the eyelid pushing on ophthalmic device 205 when blinking and/or due to differences in shape between ophthalmic device 205 and the eye, or due to insertion into or removal from the eye) are applied to ophthalmic device 205, which may otherwise cause optical aberrations or permanent displacement of the liquids if anterior element 211 were to deform. Additionally, since interface 223 is tied to anterior element 211 due, in part, to conical electrode 237 extending along an inner surface 263 of anterior element 211, interface 223 also does not generally deform in response to external forces when ophthalmic device 205 is worn.

As illustrated in FIG. 2C, first fluid 221 is disposed within cavity 217 between posterior element 213 and second fluid 227, while second fluid 227 is disposed within cavity 217 between anterior element 211 and first fluid 221. Dielectric 229 is also disposed within cavity 217 and is an insulating material (e.g., a parylene based dielectric such as at least one of Parylene-C, Parylene-N, Parylene-D, and/or Parylene AF4) that prevents a short from forming between conical electrode 237/interconnect 250 and reference electrode 219, which are physically separated from one another within cavity 217, but could be electrically shorted due to the ionic conductivity of first fluid 221 and/or the short separation distance between conical electrode 237 and reference electrode 219 without the presence of dielectric 229. In the illustrated embodiment, reference electrode 219 extends between anterior element 211 and posterior element 213 into first fluid 221. Reference electrode 219 is electrically insulated from conical electrode 237 (and interconnect 250), at least in part, by dielectric 229. In some embodiments, dielectric 229 includes a repelling layer to repel first fluid 221. In other words, reference to dielectric 229 may refer to a stack of dielectric material (e.g., a parylene based dielectric) that has a surface coated with a repelling layer that repels first fluid 221. In the same or other embodiments, dielectric 229 is a hydrophobic dielectric that repels first fluid 221 when first fluid 221 is an aqueous liquid. In some embodiments dielectric 229 is an oxide grown (e.g., thermally or anodically) on conical electrode 237/interconnect 250.

The particular orientation of first fluid 221 and second fluid 227 is attributed, at least in part, due to first repelling layer 271 and second repelling layer 273, which are selected to prevent a displacement of the orientation of first fluid 221 and second fluid 227 (e.g., makes it energetically unfavorable for first fluid 221 and second fluid 227 to switch positions within cavity 217). In one embodiment, an inner surface 263 of anterior element 211 is coated or otherwise modified to correspond to first repelling layer 271. Similarly, an inner surface 261 of posterior element 213 is coated or otherwise modified to correspond to second repelling layer 273. Thus, first repelling layer 271 is disposed between anterior element 211 and second fluid 227 to repel first fluid 221, while second repelling layer 273 is disposed between posterior element 213 and first fluid 221 to repel second fluid 227. Collectively, first repelling layer 271 and second repelling layer 273 prevent a displacement in orientation (i.e., change in position) of first fluid 221 and second fluid 227 within cavity 217. In one embodiment, first repelling layer 271 is a hydrophobic material when first fluid 221 is an aqueous solution. In the same or another embodiment, second repelling layer 273 is an underwater oleophobic material (e.g., underwater oil repelling layer) when second fluid 227 is an oil based liquid. In some embodiments, hydrophobic or oleophobic refers more specifically to having a static contact angle greater than ninety degrees when the repelled medium (e.g., water or oil, respectively) is placed on a flat surface of the corresponding repelling layer. In one embodiment, the term underwater oleophobic, indicates the static contact angle between the oleophobic material and the oil is greater than ninety degrees proximate to oleophobic material, oil, polar liquid interface (e.g., the contact angle characterization may occur within a polar liquid environment rather than air). Examples of hydrophobic materials may include fluoropolymers such as Teflon® AF-1600, Cytop, and the like. Examples of under oleophobic materials may include polyethylene glycol, polyacrylic acid, polyHEMA, silicone hydrogel, and the like.

It is appreciated that the examples provided of hydrophobic and oleophobic materials should not be deemed limiting and that other hydrophobic and oleophobic materials may be utilized to respectively form first repelling layer 271 and second repelling layer 273. In some embodiments, first repelling layer 271 and/or second repelling layer 273 may comprise a self-assembled monolayer to achieve the desired hydrophobic or oleophobic functionality. For example, dielectric 229 may be a metal oxide dielectric such as aluminum oxide or silicon oxide that has a surface (e.g., between dielectric 229 and the immiscible fluid composition of first fluid 221 and second fluid 227) functionalized by long-chained alkyl silanes or phosphonic acids (e.g., octadecylphosphonic acid, octadecylsilane, and the like) to repel first fluid 221.

In the illustrated embodiment, first repelling layer 271 extends along inner surface 263 of anterior element 211 until reaching dielectric 229, conical electrode 237, and/or interconnect 250. In such an embodiment, dielectric 229 also provides a functionality similar to first repelling layer 271 (e.g., repels first fluid 221), based on a material composition of dielectric 229 (e.g., a fluoropolymer to repel aqueous solutions). However, certain dielectrics may be relatively porous and provide poor dielectric properties that have increased propensity for dielectric breakdown. A barrier layer 247 comprising a metal oxide grown on conical electrode 237 and/or interconnect 250 may be utilized to compensate when dielectric breakdown occurs by locally growing the metal oxide proximate to the resultant dielectric breakdown defect within dielectric 229 to repair the dielectric stack. In other words, conical electrode 237 and/or interconnect 250 may be valve metals (e.g., at least one of aluminum, hafnium, niobium, tantalum, titanium, tungsten, vanadium, and/or zirconium) that utilizes a self-healing of a metal oxide to compensate for local dielectric defects within dielectric 229 during operation of the electrowetting cell.

In the same or other embodiments, conical electrode 237, interconnect 250, and/or reference electrode 219 may be valve metals that also include a metal oxide grown or otherwise deposited (e.g., via anodization, sputtering, evaporation, chemical vapor deposition, and the like) on the valve metal such that the metal oxide is disposed between the valve metal and dielectric 229 (e.g., in an embodiment where conical electrode 237 is aluminum, the metal oxide may correspond to aluminum oxide). In one embodiment, electrode 219 is a noble metal such as gold, silver, and/or platinum, while conical electrode and/or interconnect 250 is a valve metal. In another embodiment, conical electrode 237, interconnect 250, and reference electrode 219 are a valve metal with the same composition.

As illustrated in the embodiment of FIG. 2C, reference electrode 219 is disposed within cavity 217 between second fluid 227 and posterior element 213, while conical electrode 237 is separated from the two immiscible fluids (e.g., first fluid 221 and second fluid 227) by dielectric 229. As illustrated, conical electrode 237 has a conical or ovoidal shape within cavity 217 that extends along an inner surface 263 of cavity 217 formed by anterior element 211. Conical electrode 237 is defined, at least in part, by a first portion (e.g., the portion of anterior element 211 that interfaces with conical electrode 237 and/or the portion of anterior element 211 that conical electrode 237 is deposited on) of anterior element 211 proximate to the interface 223 between first fluid 221 and second fluid 227. Conical electrode 237 is coupled to controller 230 via interconnect 250. In some embodiments, a boundary defined by the shape of conical electrode 237 may define a central region (e.g., central region 203 of FIG. 2B) and peripheral region (e.g., peripheral region 207 of FIG. 2B) of ophthalmic device 205. In the illustrated embodiment, conical electrode 237 resides on or is otherwise proximate to a tapered edge of anterior element 211. Conical electrode 237 may reside at a pre-determined angle (e.g., thirty degrees, forty-five degrees, ninety degrees, or otherwise) relative to a horizontal line or plane that defines a half section of ophthalmic device 205, for example.

Overmold 257 and encasement 259 may collectively correspond to an enclosure (e.g., enclosure 115 illustrated in FIG. 1 and/or enclosure 215 illustrated in FIG. 2B). Overmold 257 may comprise an optically transparent flexible material that is gas permeable to oxygen such as silicone hydrogel or polyHEMA. Encasement 259 may comprise a transparent material (e.g., cross-linked silicone, epoxy, or otherwise) that encases controller 230, anterior element 213, and/or battery 265 with posterior element 213. In some embodiments, encasement 259 does not fully extend around anterior element 211, but rather seals controller 230 and/or battery 265 to posterior element 213.

In the illustrated embodiment, anterior element 211 and posterior element 213 each include reciprocal alignment features 269 to align anterior element 211 with posterior element 213 to form cavity 217. Reciprocal alignment features may correspond to positive (e.g., protrusions) and negative (e.g., indentations) structural features that are mated together when anterior element 211 and posterior element 213 are physically coupled. In other words, posterior element 211 may have a positive (negative) feature that mates or aligns with a negative (positive) feature of anterior element 213. In some embodiments, the reciprocal alignment features may be a continuous positive or negative feature that extends around (e.g., circumferentially) ophthalmic anterior element 211 or posterior element 213. In the same or other embodiments, the reciprocal alignment features 260 may be discontinuous (e.g., multiple positive or negative features distributed throughout the areas where anterior element 211 meets posterior element 213. In some embodiments, at least one sealant (e.g., first sealant 233 and/or second sealant 241) is disposed between anterior element 211 and posterior element 213 proximate to reciprocal alignment features 269 to seal or otherwise enclose cavity 217.

Figure 3A:
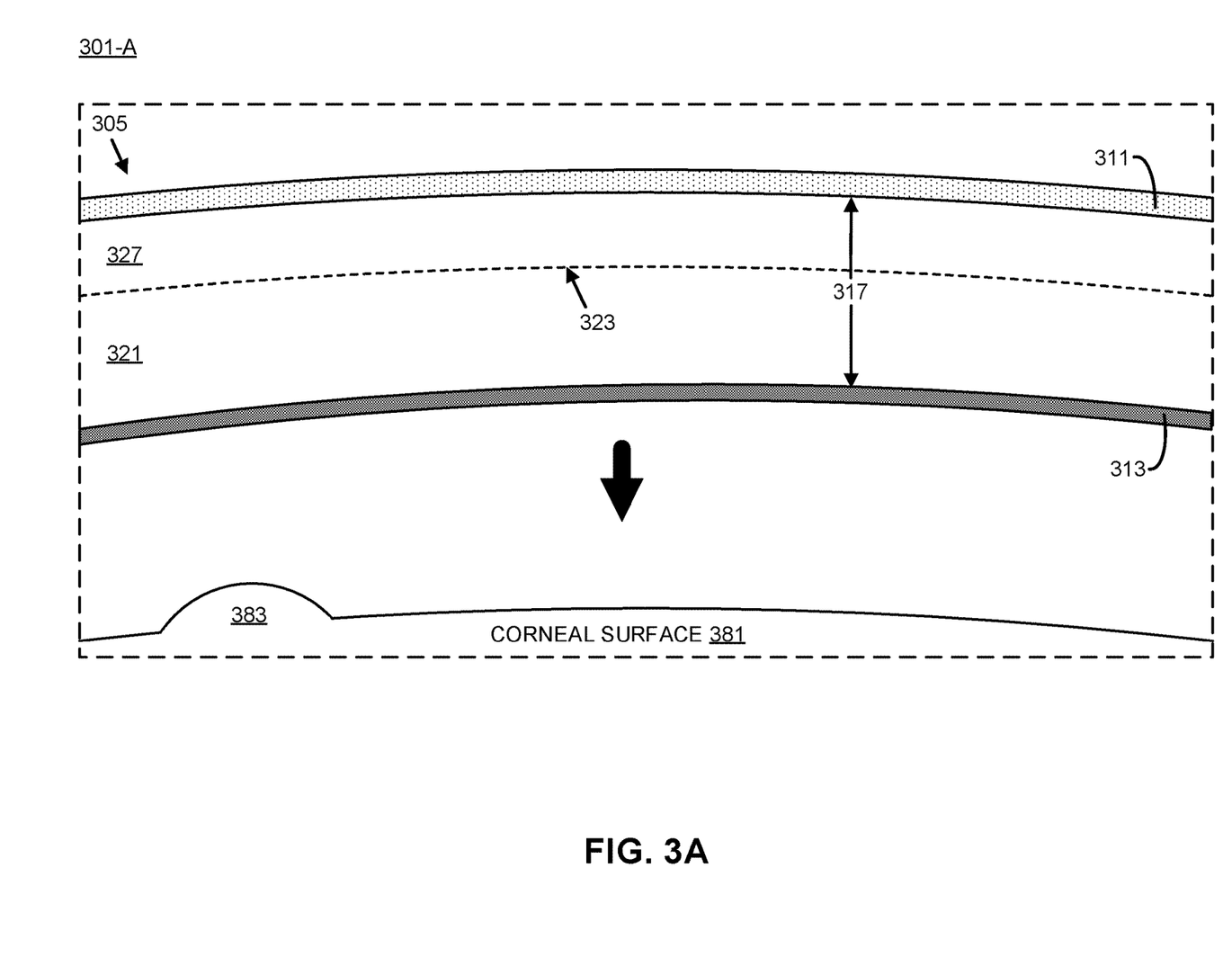
FIG. 3A illustrates a magnified view of an ophthalmic device proximate to a corneal surface of the eye for mounting the ophthalmic device on the eye, in accordance with an embodiment of the disclosure.
Figure 3B:
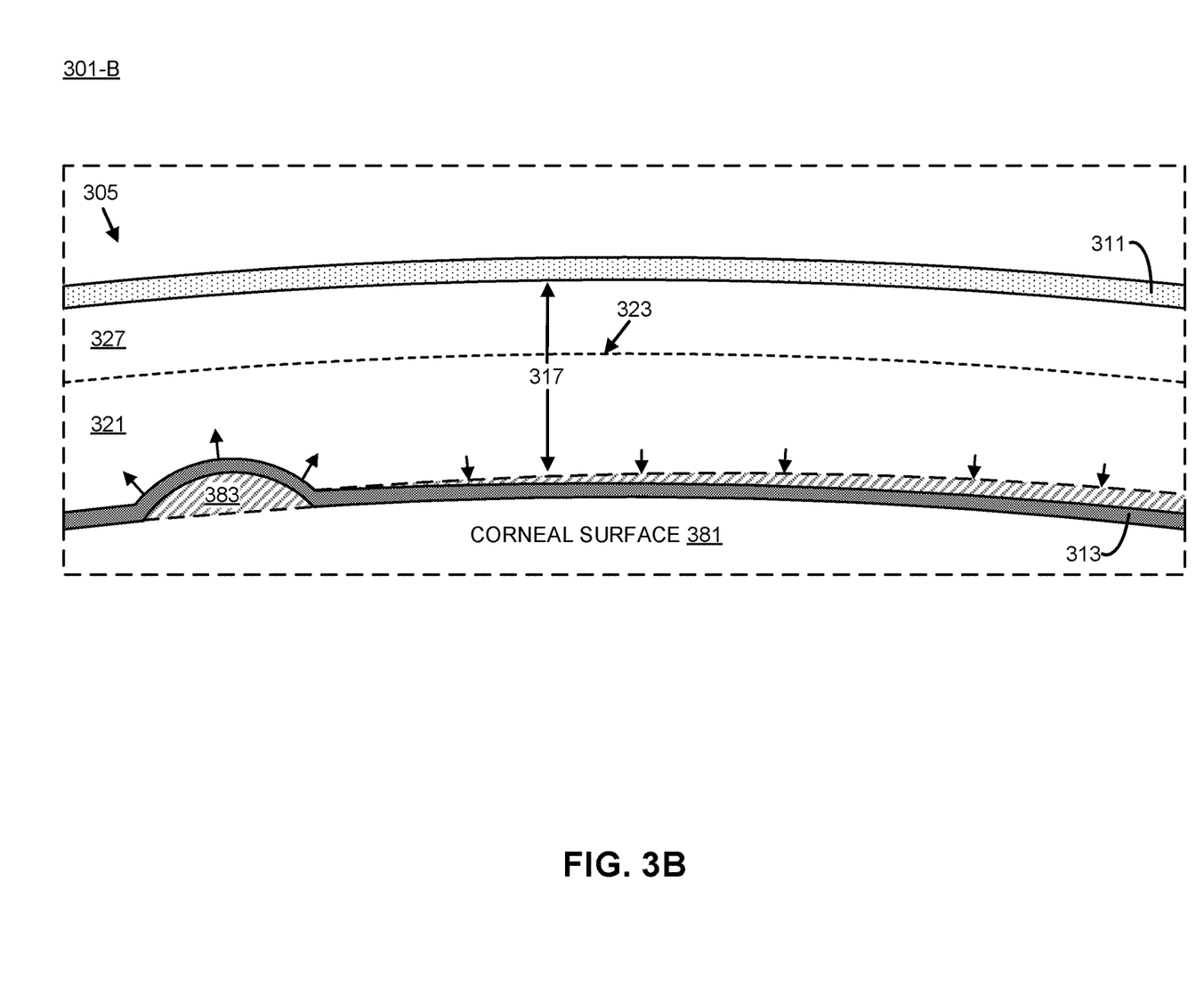
FIG. 3B illustrates a magnified view of a posterior element of the ophthalmic device conforming to a surface of an eye when the ophthalmic device is mounted on the eye, in accordance with an embodiment of the disclosure.

FIGS. 3A-3B illustrate magnified views 301-A and 301-B of ophthalmic device 305, in accordance with an embodiment of the disclosure. Ophthalmic device 305 includes anterior element 311, posterior element 313, first fluid 321, second fluid 327, cavity 317, and interface 323, which may be analogous to their identically named components included in ophthalmic device 105 illustrated in FIG. 1 and ophthalmic device 205 illustrated in FIGS. 2A-2C. In other words, ophthalmic device 305 is one possible implementation of ophthalmic device 105 and/or ophthalmic device 205, and may include the same or similar features, structures, characteristics, or combination thereof in accordance with embodiments of the disclosure.

FIG. 3A illustrates a magnified view 301-A of ophthalmic device 305 proximate to a corneal surface 381 of an eye for mounting ophthalmic device 305 on the eye, in accordance with an embodiment of the disclosure. In the illustrated embodiment, cavity 317 is defined by inner surfaces of anterior element 311 and posterior element 313. Cavity 317 is filled with two immiscible fluids (e.g., first fluid 321 and second fluid 327) and has a substantially fixed volume due to fluids generally being considered incompressible (relative to the compressive forces acting upon an ophthalmic device) and due to anterior element 211 being a rigid, gas permeable component. In some embodiments, at least a portion of posterior element 313 may initially have a comparable or similar shape as anterior element 311 and is designed or otherwise shaped for ophthalmic device 305 to be contact mounted with a surface of the eye (e.g., corneal surface 381). However, corneal surface 381 may have surface irregularities 383 caused by various ocular diseases such as keratitis and corneal dystrophies, injuries, allergies, and the like. Additionally or alternative, a geometric shape of ophthalmic device 305 may not perfectly match a shape of the eye. Because such irregularities are unique to the individual and may not be constant is size or shape, posterior element 313 is a soft component that is adapted to conform to a surface of the eye (e.g., corneal surface 381) when ophthalmic device 305 is mounted on the eye. Advantageously, having a posterior element 313 that conforms to an eye of the user allows for corneal astigmatism to be masked via a rotationally symmetric design, easier fit of the ophthalmic device 305 to the user, and a more forgiving design to an imprecise fit between the shape of ophthalmic device 305 and an eye of the user, and the like.

FIG. 3B illustrates a magnified view 301-B of posterior element 313 conforming to a surface 381 of an eye when ophthalmic device 305 is mounted on the eye, in accordance with an embodiment of the disclosure. As illustrated, a shape of posterior element 313 has changed (relative to the unmounted shape illustrated in FIG. 3A) to conform to surface irregularities 383 of the corneal surface 381. Alternatively or additionally, posterior element 313 may conform to the corneal surface 381 due to a shape mismatch between that of ophthalmic device 305 and the corneal surface 381. Since fluids are generally considered to be incompressible, fluid (e.g., first fluid 321) disposed within cavity 317 is redistributed within cavity 317 in response to the posterior element conforming to the eye when ophthalmic device 305 is mounted on the eye. For example, as shown in the illustrated embodiment, when posterior element conforms (e.g., indents) due to pressure (e.g., forces) from surface irregularity 383, a distribution of first fluid 321 changes such that the negative change in volume caused by the surface irregularity 383 is compensative by a positive change in volume across the rest of the posterior element 313 for a net zero or near zero change in total volume of cavity 317. The redistribution of first fluid 321 causes the positive change in volume by applying a distributed force across posterior element 313. In other words, a volume of cavity 315 is substantially fixed and is based on the volume of first fluid 321 and second fluid 327. It is appreciated that posterior element is not limited to deforming to surface irregularities corresponding to protrusions, but that due to surface capillary and/or vacuum forces posterior element 313 may conform to various types of surface irregularities including protrusions, indentations, shape mismatches, and the like, in accordance with embodiments of the disclosure. In some embodiments, posterior element 313 and first fluid 321 have a refractive index comparable to a corneal surface and/or tear film of the eye. Thus, when posterior element 313 deforms, it compensates for the irregularities of the corneal surface and/or mismatch between ophthalmic device 305 and the eye without degrading the optical quality and/or optical power of the device.

Figure 4:
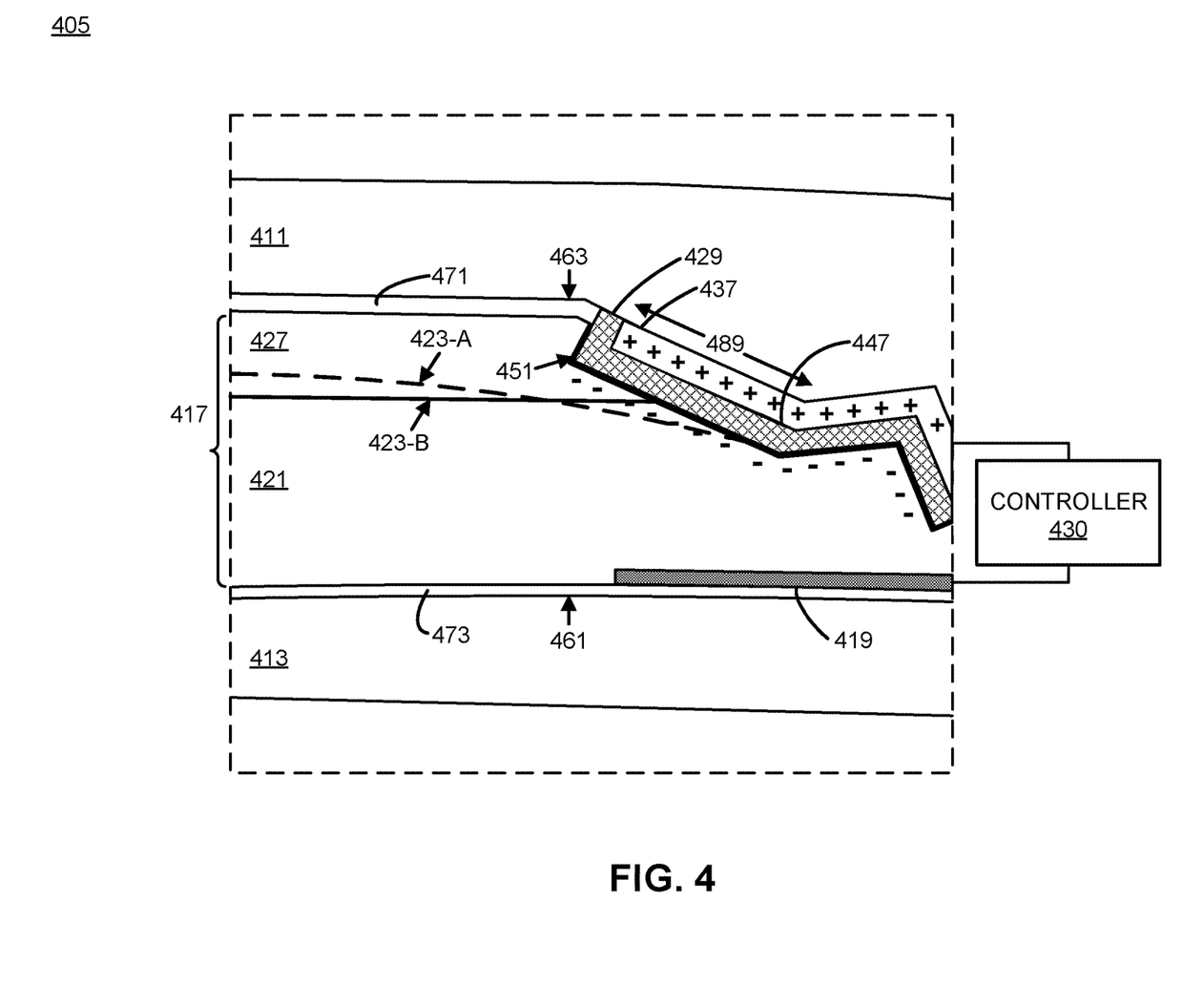
FIG. 4 illustrates a magnified view of an electrowetting ophthalmic device in operation, in accordance with an embodiment of the disclosure.

FIG. 4 illustrates a magnified view of an electrowetting ophthalmic device 405 in operation, in accordance with an embodiment of the disclosure. Ophthalmic device 405 includes anterior element 411 (including inner surface 463 and first portion 489), posterior element 413 (including inner surface 461), first fluid 421, second fluid 427, cavity 417, interface 423, reference electrode 419, conical electrode 437, dielectric 429, barrier layer 447, first repelling layer 471, second repelling layer 473, repelling layer 451, and controller 430, which may be analogous to their identically named components included in ophthalmic device 105 illustrated in FIG. 1, ophthalmic device 205 illustrated in FIGS. 2A-2C, and ophthalmic device 305 illustrated in FIGS. 3A-3B. In other words, ophthalmic device 405 is one possible implementation of ophthalmic device 105, ophthalmic device 205, and/or ophthalmic device 305, and may include the same or similar features, structures, characteristics, or combination thereof in accordance with embodiments of the disclosure.

In the illustrated embodiment, ophthalmic device 405 includes repelling layer 451 which is coated to or otherwise coupled with an inner surface of dielectric 429 to repel first fluid 421 in a similar manner as first repelling layer 471, in accordance with embodiments of the disclosure. Repelling layer 451 may have the same characteristics, material composition, and the like as first repelling layer 471, and is coupled to dielectric 429. Thus, in embodiments of the disclosure, reference to dielectric 429 may refer to an overall dielectric stack that includes repelling layer 451 and dielectric 429. In the same or other embodiments, dielectric 429 may itself have surface properties similar to repelling layer 451 and/or first repelling layer 471 (e.g., hydrophobic) to repel first fluid 421. It is also noted that the position of reference electrode 419 is merely an example of one possible embodiment, and that in other embodiments, reference electrode 419 maybe positioned elsewhere (e.g., as illustrated in FIG. 2C). In one embodiment, reference electrode 419 may be in direct contact with the first fluid 421. In other embodiments, reference electrode 419 may in capacitive contact with first fluid 421 (e.g., reference electrode 419 may be coated with an insulating layer). In some embodiments, reference electrode 419 may extend within cavity 417 to be aligned with conical electrode 437. As illustrated, conical electrode 437 is defined, at least in part, by first portion 489 of anterior element 411, which corresponds to the region of anterior element 411 that conical electrode 437 is disposed proximate to or otherwise indirectly or directly contacts (e.g., an angled, conical region of anterior element 411). In some embodiments, conical electrode 437 is coupled to controller 430 via an interconnect (e.g., interconnect 250 of FIG. 2C). However, in the illustrated embodiment, reference to conical electrode 437 also includes an interconnect to electrically couple conical electrode 437 to controller 430. Reference electrode 419 is also coupled to controller 430 (e.g., directly or indirectly via one or more interconnects). Furthermore, in some embodiments, controller 430 may control other element(s) that handle voltage delivery to or between electrodes (e.g., electrode 437 and electrode 419). In other words, one or more elements or electronic components may be disposed between controller 430 and electrodes 437 and 419.

In the illustrated embodiment, a shape of interface 423 (e.g., from interface 423-A to interface 423-B, or vice versa) may be adjusted or changed within cavity 417 via controller 430, which is analogous to controller 130 of FIG. 1 and/or controller 230 of FIGS. 2B-2C. Controller 430 leverages an electrowetting effect of ophthalmic device 405 to adjust the wetting characteristics of the two immiscible fluids (e.g., first fluid 421 and/or second fluid 427) with respect to a surface proximate to dielectric 429 (e.g., the inner surface of dielectric 429 that directly or indirectly interfaces with first fluid 421 and/or second fluid 427). The wetting characteristics are dependent on the relationship of the surface tension or energy between first fluid 421, second fluid 427, dielectric 429, and/or repelling layer 451, which includes both chemical and electrical components. The chemical components correspond to the intrinsic material properties of first fluid 421, second fluid 427, dielectric 429, and/or repelling layer 451, while the electrical components corresponds to an applied external electrical force (e.g., an electric field generated by applying a potential difference or bias between reference electrode 419 and conical electrode 437).

Controller 430 is coupled to a power supply (e.g., battery 165 illustrated in FIG. 1) to apply a bias (or lack thereof) between reference electrode 419 and conical electrode 437 to modulate the wetting characteristics. Interface 423-A is representative of a default electrowetting state of ophthalmic device 405, in which a bias is not actively being applied between reference electrode 419 and conical electrode 437. Thus, in the default state, the electrical component of the surface tension is substantially insignificant relative to the chemical component. Furthermore, since dielectric 429 and/or repelling layer 451 are selected from materials that are repellent to first fluid 421 (e.g., hydrophobic in embodiments where first fluid 421 is an aqueous solution), it is energetically unfavorable for first fluid 421 to wet the surface proximate to conical electrode 437. Thus, as illustrated via interface 423-A, first fluid 421 dewets or otherwise tries to reduce contact with repelling layer 451 and/or dielectric 429 to reduce or minimize surface energy.

In the illustrated embodiment of FIG. 4, the shape of the interface 423 is changed (e.g., from interface 423-A to interface 423-B) via controller 430 transitioning from not actively applying a bias to actively applying a bias (e.g., a voltage) across and/or between reference electrode 419 and conical electrode 437. In some embodiments, the bias may be generated via direct or alternating current between reference electrode 419 and conical electrode 437. As illustrated, reference electrode 419 corresponds to a cathode and may be coupled through controller 430 to a reference or ground terminal of a power supply (e.g., battery 165 illustrated in FIG. 1). Conversely, conical electrode 437 corresponds to an anode and may be coupled through controller 430 to a positive terminal of a power supply (e.g., battery 165 illustrated in FIG. 1). In the illustrated embodiment, the bias generates an electric field between reference electrode 419 and conical electrode 437, and in a manner similar to a capacitor, charge is built up (i.e., stored) proximate to opposing sides of dielectric 429, with negative charge proximate to the interface between the two immiscible fluids (e.g., first fluid 421 and second fluid 427) and dielectric 429, and positive charge proximate to the interface between conical electrode 437 and dielectric 429. The negative charge influences the wetting characteristics (e.g., the electrical component of the surface tension) between first fluid 421 and dielectric 429 making it more energetically favorable (relative to when the bias is not applied or when there is no potential difference) for first fluid 421 to wet dielectric 429. Consequently, a shape of interface 423 shifts (e.g., from 423-A to 423-B, or vice versa) to transition to a more energetically favorable state (e.g., from a high energy state to a low energy state). In some embodiments, this corresponds to interface 423 transitioning from a convex shape (e.g., 423-A) to a less convex shape (e.g., 423-B).

Advantageously, the electrowetting system for embodiments of ophthalmic devices described within the disclosure (e.g., ophthalmic device 105 of FIG. 1, ophthalmic device 205 of FIGS. 2A-2C, ophthalmic device 305 of FIGS. 3A-3B, and/or ophthalmic device 405 of FIG. 4) are self-healing systems. For example, in the embodiment illustrated of FIG. 4, when there is a bias applied between conical electrode 437 and first fluid 421 (e.g., via reference electrode 419) a barrier layer 447 may be formed (e.g., via an anodization process). Barrier layer 447 may correspond to a metal oxide, which has a composition based on the underlying material composition of electrode 437, and is grown on the surface of electrode 437 proximate to dielectric 429 to locally repair defects that may occur due to damage (e.g., from dielectric fatigue, environmental contaminants, physical manipulation of the device, and the like). The anodization process compensates for damage to dielectric 429 by forming or growing a secondary dielectric (e.g., barrier layer 447) proximate to the damaged region of dielectric 429 (e.g., locally repaired), which collectively forms a dielectric stack that compensates for the damage. Furthermore, if barrier layer 447 is damaged or is otherwise below some threshold thickness, the anodization process will continue to grow barrier layer 447 until the threshold thickness is reached. In other words, the anodization process may repair local damage to the dielectric stack (e.g., the combined dielectric stack of barrier layer 447 and dielectric 429) in the event that dielectric 429 and/or barrier layer 447 has been damaged (e.g., due to dielectric breakdown during operation, physical manipulation of the device, and the like). Moreover, by locally repairing the dielectric, electrolysis of the first fluid 321 is reduced and/or prevented.

The anodization process may correspond to an electrochemical reaction between mobile metal cations (e.g., from conical electrode 437) and anions within first fluid 421 (e.g., $O^{2-}$ and/or $OH^-$ in embodiments where first fluid 421 is an aqueous solution) when the bias is applied (e.g., during operation of ophthalmic device 405) between conical electrode 437 and first fluid 421 (e.g., via reference electrode 419). The metal cations from conical electrode 437 and anions from first fluid 421 are driven towards the metal/dielectric interface by the electric field resultant of the applied bias, react accordingly, and form an anodic metal oxide (e.g., $Al_2O_3$, $AlO_x$, or other aluminum oxide variants in embodiments where electrode 437 comprises aluminum and the first fluid 421 is an aqueous solution). Thus in some embodiments, barrier layer 447 may correspond to local oxide growth on conical electrode 437 proximate to regions where dielectric 429 has been damaged (e.g., via dielectric breakdown). In the same or other embodiments, barrier layer 447 may not be limited to local oxide growth, but rather may coat the interface between electrode 437 and dielectric 429. A thickness of barrier layer 447 may be based on the magnitude of the potential difference applied between conical electrode 437 and reference electrode 419, the material composition of conical electrode 437, and a duration of the anodization process.

Figure 5:
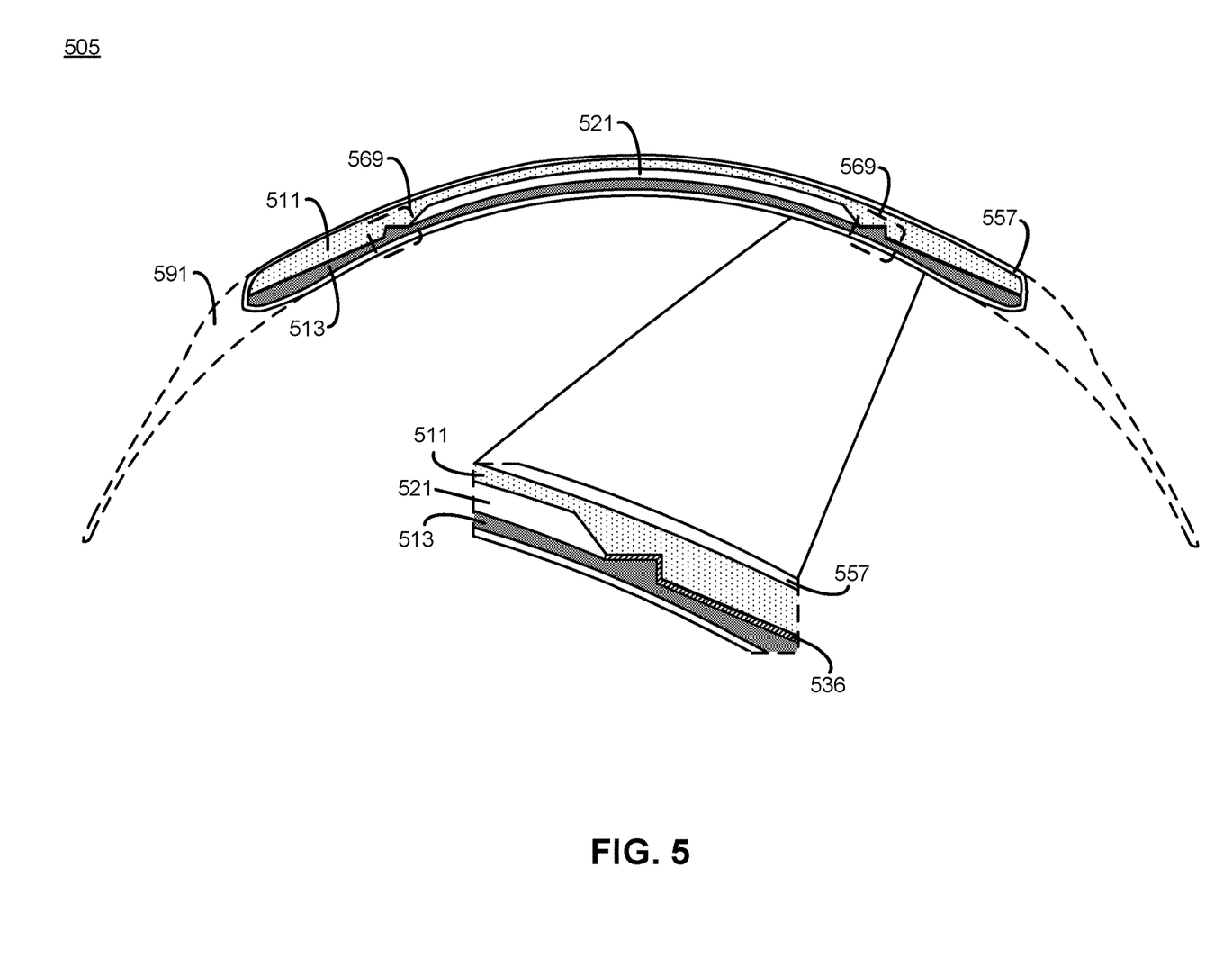
FIG. 5 illustrates a cross-sectional view of a contact lens with a soft posterior element, in accordance with an embodiment of the disclosure.

FIG. 5 illustrates a cross-sectional view of a contact lens 505 with a soft posterior element 513, in accordance with an embodiment of the disclosure. Contact lens 505 includes anterior element 511, posterior element 513, first fluid 521, sealant 536, overmold 557, reciprocal alignment features 569, and skirt 591, which may be analogous to their identically named components included in ophthalmic device 105 illustrated in FIG. 1, ophthalmic device 205 illustrated in FIGS. 2A-2C, ophthalmic device 305 illustrated in FIGS. 3A-3B. In the illustrated embodiment, contact lens 505 is not an electrowetting device, but leverages anterior element 511 as a rigid component to provide optical clarity and posterior element 513 as a soft component to provide user comfort when contact lens 505 is worn in a manner similar to ophthalmic devices described in various embodiments of the disclosure. Optical power of contact lens 505 may be defined, at least in part, by anterior element 511 (e.g., based on a shape of the convex surface of anterior element 511). Advantageously, contact lens 505 may be a low-cost (e.g., disposable) contact lens that provides static vision correction for everyday wear.

In the illustrated embodiment, anterior element 511 and posterior element 513 are coupled together via sealant 536 (e.g., first sealant 233 and/or second sealant 241 illustrated in FIG. 2C) to form a cavity (e.g., cavity 217 illustrated in FIG. 2C). Posterior element 513 is adapted (e.g., is a soft material) to conform to a surface of an eye when the contact lens is mounted on the eye. Anterior element 511 is coupled to posterior element 513 to form the cavity within the contact lens. An elastic modulus of anterior element 511 is greater than an elastic modulus of posterior element 513 to provide greater rigidity to contact lens 505 relative to posterior element 513. First fluid 521 (e.g., water, glycol, or oil) is disposed within the cavity, and in some embodiments, fills the cavity to define a volume of the cavity. In one embodiment, first fluid 521 includes saline. In the same or other embodiments, first fluid 521 is specifically selected or otherwise tuned to have a refractive index substantially the same as the cornea of an eye to optically conceal irregularities of the eye. When contact lens 505 is mounted on an eye (e.g., worn) a distribution of the first fluid within the cavity changes in response to posterior element 513 conforming to the eye (e.g., as described in reference to FIG. 3B). In one or more embodiments, anterior element 511 and/or posterior element 513 are gas permeable to oxygen, each with a gas permeability to oxygen sufficient to oxygenate the cornea (e.g., oxygen gas permeability greater than 10, 30, 100, or 200 Barrer). In some embodiments, contact lens 505 includes overmold 557 (e.g., silicone hydrogel) that surrounds or otherwise encloses anterior element 511 and posterior element 513. In one embodiment, overmold 557 extends beyond anterior element 511 and posterior element 513 to form skirt 591 and may have the same or similar elastic properties (e.g., soft) as posterior element 513. In other embodiments, skirt 591 and/or overmold 557 may be an extension of posterior element 513. Thus, overmold 557 and skirt 591 may have an elastic modulus less than anterior element 511; meaning rigidity of contact lens 505 may be substantially defined by the elastic properties and shape of anterior element 511.

The processes explained above are described in terms of computer software and hardware. The techniques described may constitute machine-executable instructions embodied within a tangible or non-transitory machine (e.g., computer) readable storage medium, that when executed by a machine (e.g., controller 130) will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A contact lens, comprising:
   a posterior element adapted to conform to a surface of an eye when the contact lens is mounted on the eye;
   an anterior element coupled to the posterior element to form a cavity within the contact lens, wherein a flexibility of the posterior element is greater than a flexibility of the anterior element, wherein a concave surface of the anterior element is disposed between a convex surface of the posterior element and a convex surface of the anterior element, and wherein the concave surface of the anterior element and the convex surface of the posterior element define a boundary of the cavity;
   two immiscible fluids, including a first fluid and a second fluid, disposed within the cavity, wherein an interface between the first fluid and the second fluid forms a lens to provide an adjustable optical power to the contact lens dependent on a shape of the interface;
   a first repelling layer disposed between the anterior element and the second fluid to repel the first fluid; and
   a second repelling layer disposed between the posterior element and the first fluid to repel the second fluid, and wherein the first repelling layer and the second repelling layer collectively prevent a displacement in orientation of the first fluid and the second fluid within the cavity.

2. The contact lens of claim 1, wherein the flexibility of the posterior element is greater than the flexibility of the anterior element due, at least in part, to an elastic modulus of the posterior element being less than an elastic modulus of the anterior element.

3. The contact lens of claim 1, wherein the flexibility of the anterior element is greater than the flexibility of the posterior element due, at least in part, to differences in at least one of shape or thickness between the anterior element and the posterior element.

4. The contact lens of claim 3, wherein a material composition of the anterior element is substantially equivalent to a material composition of the posterior element.

5. The contact lens of claim 1, further comprising:
   a conical electrode extending along an inner surface of the cavity formed by the anterior element, wherein the conical electrode is defined, at least in part, by a first portion of the anterior element proximate to the interface between the first fluid and the second fluid.

6. The contact lens of claim 5, further comprising:
   a sensor system to provide an accommodation signal representative of a physiological response of the eye that is indicative of an accommodative effort; and
   a controller coupled to the sensor system and the conical electrode to receive the accommodation signal and to adjust an optical power of the contact lens by changing the shape of the interface in response to the accommodative effort, wherein the optical power is based, at least in part, on the adjustable optical power.

7. The contact lens of claim 5, further comprising:
   a dielectric disposed between the conical electrode and the two immiscible fluids; and
   a reference electrode extending between the anterior element and the posterior element into the first fluid, wherein the reference electrode is electrically insulated from the conical electrode, at least in part, by the dielectric.

8. The contact lens of claim 7, wherein the dielectric is a hydrophobic dielectric, wherein the first fluid includes a polar liquid, and wherein the second fluid includes a non-polar liquid.

9. The contact lens of claim 1, wherein the first fluid is an electrolyte solution that includes one or more electrolytes dissolved in an aqueous solvent.

10. The contact lens of claim 1, wherein the first fluid is disposed between the second fluid and the posterior element, and wherein the second fluid is disposed between the first fluid and the anterior element.

11. The contact lens of claim 1, wherein the contact lens is collectively oxygen permeable with an overall oxygen gas permeability greater than at least one of 10, 50, or 100 Barrer.

12. The contact lens of claim 1, wherein the anterior element and the posterior element each include reciprocal alignment features to align the anterior element with the posterior element to form the cavity.

13. The contact lens of claim 12, further including at least one sealant disposed between the anterior element and the posterior element proximate to the reciprocal alignment features of the anterior element and the posterior element to seal the cavity.

14. The contact lens of claim 12, wherein the anterior element and posterior element are sealed together via laser welding such that portions of the anterior element and posterior element proximate to the reciprocal alignment features are fused together.

15. The contact lens of claim 1, wherein an outer surface of the cavity formed by the anterior element is shaped to provide a base optical power to the contact lens.

16. The contact lens of claim 1, wherein a volume of the cavity is substantially fixed and is based, at least in part, on a volume of the first fluid.

17. The contact lens of claim 1, wherein a refractive index of the first fluid is substantially equal to a refractive index of a cornea of the eye.

18. The contact lens of claim 1, further comprising an overmold, wherein the posterior element, the anterior element, and the first fluid are disposed within the overmold.

19. The contact lens of claim 18, wherein the overmold is an optically transparent material that is gas permeable to oxygen.

20. The contact lens of claim 1, further comprising:
   a conical electrode extending along the concave surface of the anterior element that forms an inner surface of the cavity, wherein the conical electrode includes a valve metal;
   a dielectric disposed between the conical electrode and the first fluid within the cavity; and
   a self-healing metal oxide disposed between the conical electrode and the dielectric to compensate for dielectric defects within the dielectric during operation of the contact lens.

21. An electrowetting cell for an ophthalmic device, the electrowetting cell comprising:
   a posterior element;
   an anterior element mated with the posterior element to form a cavity, wherein a stiffness of the anterior element is greater than a stiffness of the posterior element, wherein a concave surface of the anterior element is disposed between a convex surface of the posterior element and a convex surface of the anterior element, and wherein the concave surface of the anterior element and the convex surface of the posterior element define a boundary of the cavity;

two immiscible fluids, including a first fluid and a second fluid, disposed within the cavity, wherein an interface between the first fluid and the second fluid forms a lens to provide adjustable optical power to the electrowetting cell dependent on a shape of the interface;

a first repelling layer disposed between the anterior element and the second fluid to repel the first fluid; and a second repelling layer disposed between the posterior element and the first fluid to repel the second fluid, and wherein the first repelling layer and the second repelling layer collectively prevent a displacement in orientation of the first fluid and the second fluid within the cavity.

22. The electrowetting cell of claim 21, wherein the stiffness of the anterior element is greater than the stiffness of the posterior element due, at least in part, to at least one of an intrinsic material property or an extrinsic material property of the anterior element and the posterior element.

23. The electrowetting cell of claim 22, wherein the intrinsic material property includes an elastic modulus of the anterior element and the posterior element, and wherein the extrinsic material property includes at least one a shape or thickness of the anterior element and the posterior element.

24. The electrowetting cell of claim 21, further comprising:

a conical electrode extending along an inner surface of the cavity formed by the anterior element, wherein the conical electrode is defined, at least in part, by a first portion of the anterior element proximate to the interface between the first fluid and the second fluid.

25. The electrowetting cell of claim 21, wherein the anterior element and the posterior element each include reciprocal alignment features to align the anterior element with the posterior element to form the cavity.

26. The electrowetting cell of claim 21, wherein an outer surface of the cavity formed by the anterior element is shaped to provide a base optical power to the electrowetting cell.

27. A contact lens, comprising:

a posterior element adapted to conform to a surface of an eye when the contact lens is mounted on the eye;

an anterior element coupled to the posterior element to form a cavity within the contact lens, wherein a flexibility of the posterior element is greater than a flexibility of the anterior element, wherein a concave surface of the anterior element is disposed between a convex surface of the posterior element and a convex surface of the anterior element, and wherein the concave surface of the anterior element and the convex surface of the posterior element define a boundary of the cavity;

a first fluid disposed within the cavity, wherein a distribution of the first fluid within the cavity changes in response to the posterior element conforming to the eye when the contact lens is mounted on the eye;

a conical electrode extending along the concave surface of the anterior element that forms an inner surface of the cavity, wherein the conical electrode includes a valve metal;

a dielectric disposed between the conical electrode and the first fluid within the cavity; and a self-healing metal oxide disposed between the conical electrode and the dielectric to compensate for dielectric defects within the dielectric during operation of the contact lens.

* * * * *